(12) United States Patent
Parsons et al.

(10) Patent No.: US 12,722,792 B2
(45) Date of Patent: Sep. 1, 2026

(54) ENGINE NACELLE INLET HAVING A ROUGHENED TURBULATOR SURFACE

(71) Applicant: The Boeing Company, Arlington, VA (US)

(72) Inventors: Jason Christopher Parsons, Summerville, SC (US); James William Kaminski, Charleston, SC (US); Jeffrey D. Crouch, Sammamish, WA (US); Rocco Tomasso, Seattle, WA (US); Andrew David Clark, Mill Creek, WA (US); Jeffrey Scott Harasha, Bellevue, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/660,650

(22) Filed: May 10, 2024

(65) Prior Publication Data

US 2025/0346359 A1 Nov. 13, 2025

(51) Int. Cl.
*B64D 33/02* (2006.01)
*B64C 21/10* (2006.01)

(52) U.S. Cl.
CPC .............. *B64D 33/02* (2013.01); *B64C 21/10* (2013.01); *B64D 2033/0226* (2013.01); *B64D 2033/024* (2013.01)

(58) Field of Classification Search
CPC .................... B64C 21/10; B64D 33/02; B64D 2033/0226; B64D 2033/0233; B64D 2033/024; B64D 2033/0273; B64D 2033/0286; F02C 7/047
See application file for complete search history.

(56) References Cited

U.S. PATENT DOCUMENTS

| | | | |
|---|---|---|---|
| 3,578,264 | A | 5/1971 | Kuethe |
| 3,664,612 | A | 5/1972 | Skidmore et al. |
| 3,819,008 | A | 6/1974 | Evans et al. |
| 4,154,256 | A | 5/1979 | Miller |
| 5,156,362 | A | 10/1992 | Leon |
| 6,655,632 | B1 | 12/2003 | Gupta et al. |
| 7,878,759 | B2 | 2/2011 | Mills et al. |

(Continued)

FOREIGN PATENT DOCUMENTS

| | | | |
|---|---|---|---|
| CA | 2899238 | A1 | 7/2014 |
| EP | 1973780 | B1 | 5/2009 |
| EP | 2071155 | A2 | 6/2009 |

OTHER PUBLICATIONS

Davis, W., et al., "Infrared thermography techniques for boundary layer state visualisation", XXVI Biennial Symposium on Measuring Techniques in Turbomachinery, Journal of Physics: Conference Series, Aug. 24, 2023, pp. 1-16.

(Continued)

*Primary Examiner* — Scott J Walthour
(74) *Attorney, Agent, or Firm* — COATS & BENNETT, PLLC

(57) ABSTRACT

A nacelle inlet that includes an inner flow surface and an outer flow surface. A turbulator surface is positioned along the inner flow surface and includes a roughened surface with the turbulator surface configured to transition laminar airflow along the inner flow surface upstream from the turbulator surface to turbulent airflow downstream from the turbulator surface.

16 Claims, 7 Drawing Sheets

(56) References Cited

U.S. PATENT DOCUMENTS

| | | | |
|---|---|---|---|
| 8,408,491 | B2 | 4/2013 | Jain et al. |
| 8,529,188 | B2 | 9/2013 | Winter |
| 9,273,558 | B2 | 3/2016 | Liang |
| 9,725,190 | B2 | 8/2017 | Batt et al. |
| 10,294,867 | B2 | 5/2019 | Lumbab et al. |
| 11,702,982 | B2 | 7/2023 | Gelzer et al. |
| 2005/0274103 | A1 | 12/2005 | Prasad et al. |
| 2009/0155067 | A1 | 6/2009 | Haas |
| 2011/0138578 | A1 | 6/2011 | Premazzi et al. |
| 2014/0047845 | A1* | 2/2014 | Kodukulla ................ F23R 3/08 60/754 |
| 2016/0209034 | A1* | 7/2016 | Maurer ................. B23K 11/115 |
| 2017/0314412 | A1* | 11/2017 | Tiwari .................... F01D 25/14 |
| 2018/0194485 | A1 | 7/2018 | Chilukuri |
| 2021/0231054 | A1 | 7/2021 | Dindar et al. |
| 2022/0099023 | A1 | 3/2022 | Pascal et al. |
| 2022/0356839 | A1 | 11/2022 | LaBelle et al. |
| 2024/0253799 | A1* | 8/2024 | Lafly ......................... F02C 7/04 |

OTHER PUBLICATIONS

Luckring, J., et al., "An Application of CFD to Guide Forced Boundary-Layer Transition for Low-Speed Tests of a Hybrid Wing-Body Configuration", AIAA 34th Applied Aerodynamics Conference, Jan. 1, 2016, pp. 1-23, Washington, DC.

Van Nesselrooij, M., et al., "Drag reduction in turbulent boundary layers by means of dimpled surfaces", Delft University of Technology, Faculty of Aerospace Engineering, Dec. 4, 2017, pp. 1-19.

EP Search Report mailed Sep. 15, 2025 in re EP Application No. 25171721.1.

* cited by examiner 28
33
36
27
32
30
A
35
34
31
91
20
47
41
24
40
26
50
61
62
45
23
22
C/L
60
25
21

ENGINE NACELLE INLET HAVING A ROUGHENED TURBULATOR SURFACE

TECHNOLOGICAL FIELD

The present disclosure relates generally to the field of engine nacelles and, more specifically, the present disclosure relates to the field of transitioning airflow from laminar to turbulent within an engine nacelle inlet to facilitate cooling.

BACKGROUND

An engine nacelle is a housing that extends around an engine on an aircraft. The nacelle includes an inlet that directs the air to the engine. The nacelle inlet can function to protect the engine, such as a gas turbine engine, from ingesting foreign objects. The nacelle inlet is further configured to direct air to the engine. The nacelle inlet is heated during aircraft use to prevent icing. The heating occurs by directing heated air from the engine into one or more interior sections of the nacelle inlet. An issue with the heating is that one or more sections of the nacelle inlet can reach an excessively elevated temperature. One location of the nacelle inlet that can experience excessively elevated temperatures is along an inner flow surface of the nacelle inlet.

Cooling of the one or more sections of the nacelle inlet occurs as a result of heat transfer to the air that enters the engine through the nacelle inlet. As a product of the air flowing along the surfaces, heat is drawn out of the one or more sections which reduces the surface temperature. The inner flow surface of the nacelle inlet is configured to promote laminar airflow over the one or more sections. Laminar airflow is uniform and reduces drag. However the boundary layer has a relatively low level of mixing and retains the heat drawn from the heated lipskin and carries this heat downstream. Turbulent airflow disrupts this boundary layer heat transfer effect by promoting mixing with the adjacent cooler airflow, thus reducing the heat transfer into adjacent structure downstream.

Thus, there is a need to transition airflow from laminar to turbulent locally within the nacelle inlet to reduce excessive temperature of adjacent structure downstream of the heated sections.

SUMMARY

One aspect is directed to a nacelle inlet for an engine. The nacelle inlet comprises an inner flow surface, an outer flow surface, and a turbulator surface positioned along the inner flow surface and comprising a roughened surface with the turbulator surface configured to transition laminar airflow along the inner flow surface upstream from the turbulator surface to turbulent airflow downstream from the turbulator surface.

In another aspect, the turbulator surface extends continuously around a circumference of an inner flow surface of the nacelle inlet.

In another aspect, the turbulator surface comprises a plurality of sections that are spaced apart around a circumference of an inner flow surface of the nacelle inlet and with gaps positioned between the plurality of sections.

In another aspect, the turbulator surface is a strip with a leading edge and a trailing edge and with a width measured between the leading edge and the trailing edge.

In another aspect, the width is constant along the turbulator surface.

In another aspect, the strip comprises a chevron shape.

In another aspect, the strip is a first strip and the turbulator surface further comprises one or more additional strips each with the roughened surface.

In another aspect, the turbulator surface comprises a peened surface with a plurality of indentations.

In another aspect, the turbulator surface is positioned along the inner flow surface between a hilite and a downstream edge of a lipskin.

One aspect is directed to a nacelle inlet for an engine. The nacelle inlet comprises a lipskin positioned at a forward end of the nacelle inlet with the nacelle inlet comprising a lipskin inner flow surface. An inner barrel is positioned downstream from the lipskin inner flow surface. A turbulator surface is positioned in the lipskin inner flow surface with the turbulator surface configured to transition laminar airflow to turbulent airflow downstream along the inner barrel to draw heat from the inner barrel.

In another aspect, the lipskin inner flow surface comprises a smooth surface and the turbulator surface comprises a roughened surface.

In another aspect, the turbulator surface comprises a peened surface with a plurality of indentations.

In another aspect, a joint is formed between a downstream edge of the lipskin inner flow surface and an upstream edge of the inner barrel with the turbulator surface positioned forward from the joint.

In another aspect, a bulkhead spans a lipskin annulus with the bulkhead comprising a flange that extends across an inner side of the joint.

In another aspect, the turbulator surface extends continuously around a circumference of the nacelle inlet.

In another aspect, the turbulator surface is arranged in a strip with a leading edge and a trailing edge.

In another aspect, the strip is a first strip and the turbulator surface further comprising one or more additional strips spaced away from the first strip.

One aspect is directed to a method of cooling a section of an inner flow surface of a nacelle inlet. The method comprises: directing air through the nacelle inlet with the air initially having laminar flow along an upstream section of the inner flow surface; directing the air over a turbulator surface on the inner flow surface after the air has passed over the upstream section and transitioning the air to have turbulent flow; and directing the air with turbulent flow over a downstream section of the inner flow surface of the nacelle inlet.

In another aspect, the method further comprises directing turbulent airflow through an inner barrel of the nacelle inlet that is positioned downstream from a lipskin of the nacelle inlet.

In another aspect, directing the air over the turbulator surface comprises directing the air over indentions formed on the inner flow surface.

The features, functions and advantages that have been discussed can be achieved independently in various aspects or may be combined in yet other aspects, further details of which can be seen with reference to the following description and the drawings.

DETAILED DESCRIPTION

Figure 1:
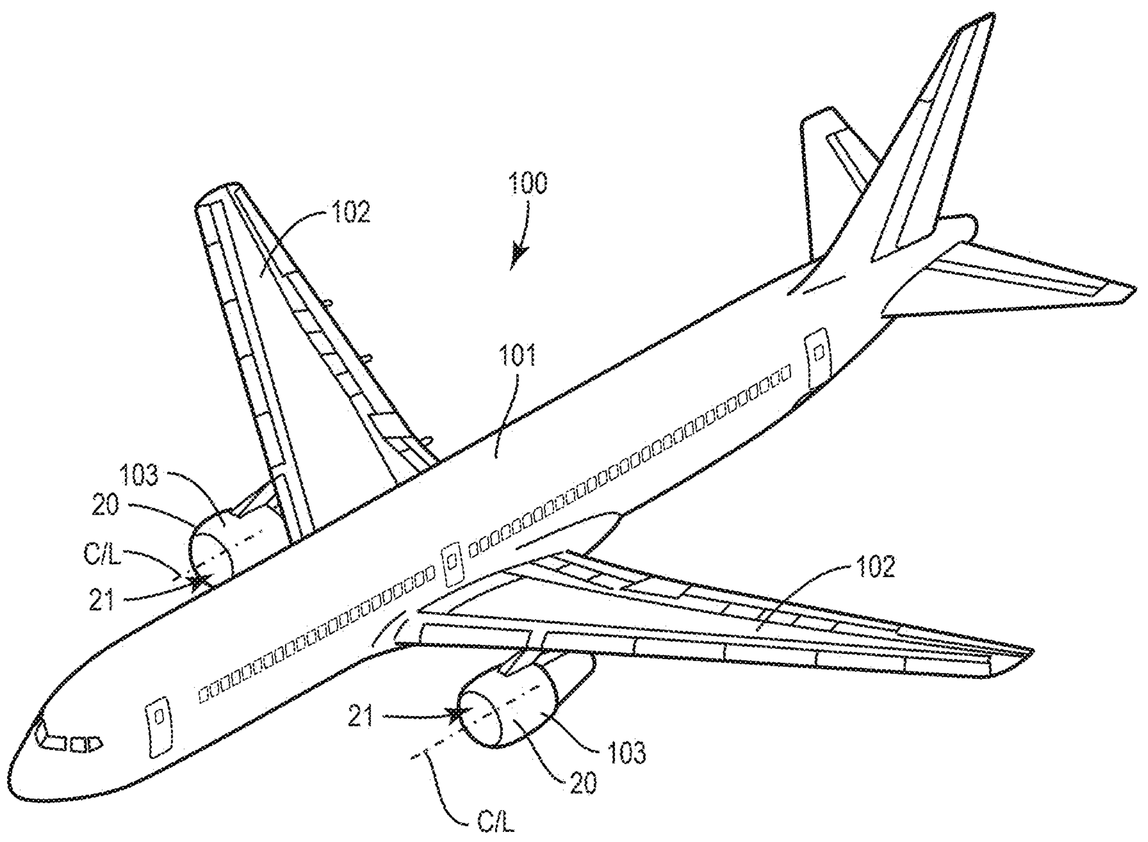
FIG. 1 is an isometric view of an aircraft with nacelles positioned underneath each of the wings.

FIG. 1 illustrates an aircraft 100 configured to transport people and/or cargo. The aircraft 100 generally includes a fuselage 101 and wings 102. Engines 103 are mounted on the wings 102 to propel the aircraft 100 during flight. The number and positioning of the engines 103 can vary depending upon the aircraft 100. In some examples, the engines 103 are gas turbine engines, such as a turbofan engine.

Figure 2:
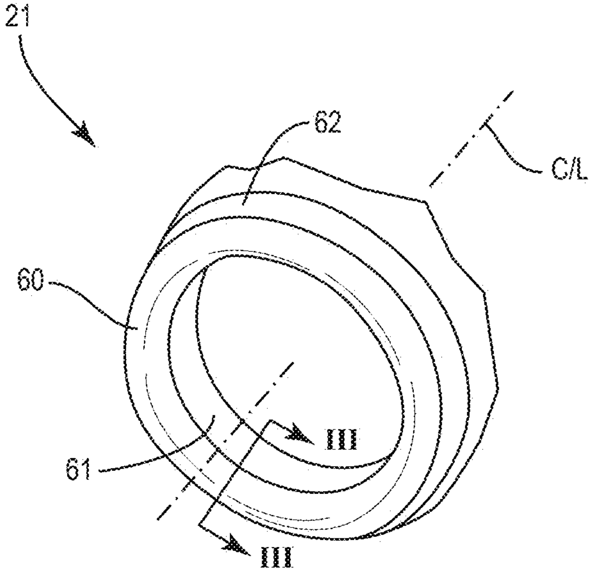
FIG. 2 is a perspective view of a nacelle inlet.
Figure 3:
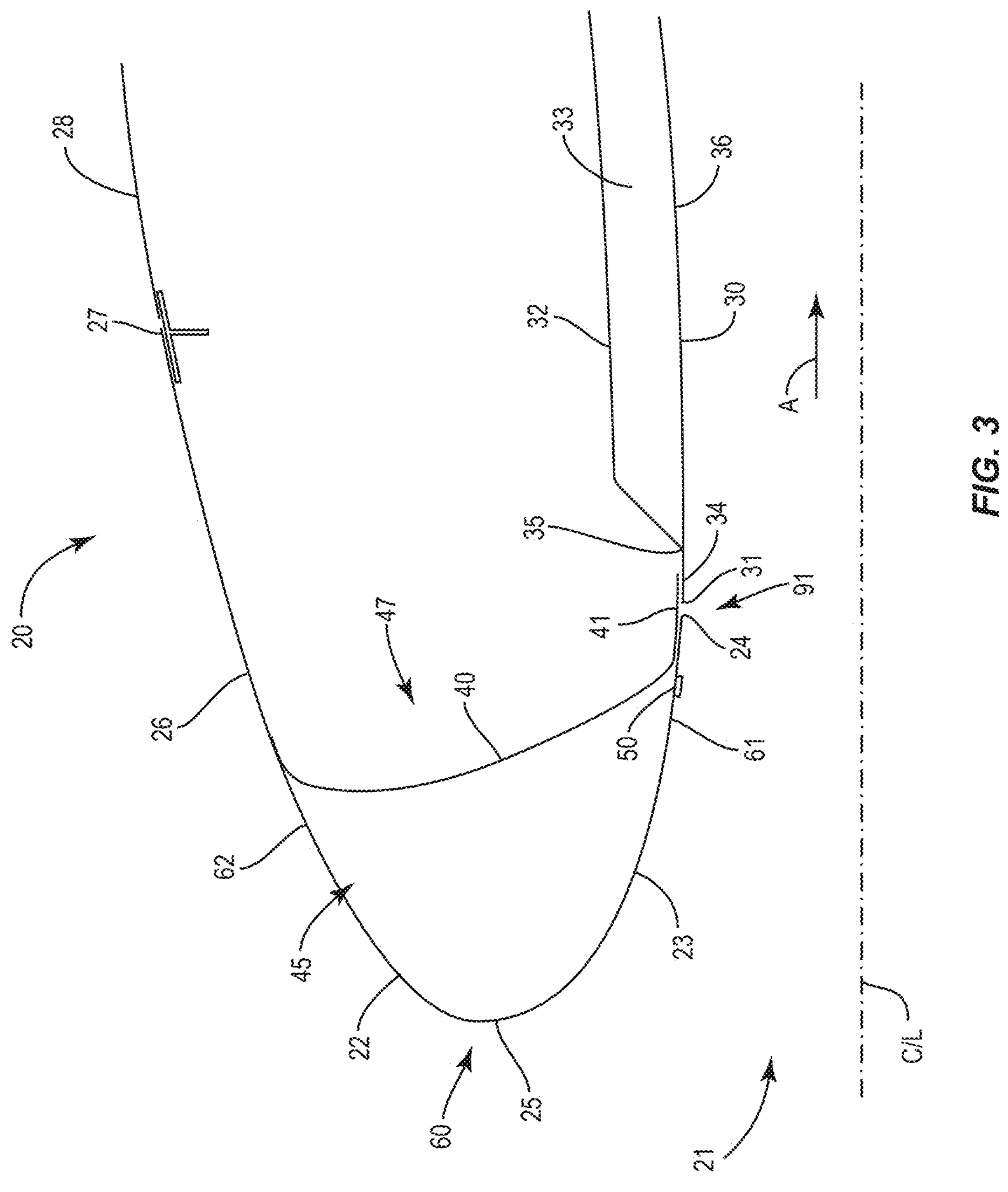
FIG. 3 is a schematic section view of a portion of the nacelle having an inner flow surface leading into the engine and an opposing outer flow surface.

The engines 103 include a nacelle 20 that extends around the exterior. The nacelle 20 has an aerodynamic profile to reduce drag. The nacelle 20 includes a nacelle inlet 21 that directs airflow into the engine 103 and extends around a centerline C/L. As illustrated in FIGS. 2 and 3, the nacelle inlet 21 includes a forward end 60, an inner flow surface 61 that extends along an interior side, and an outer flow surface 62 that extends along the exterior side. The inner flow surface 61 and outer flow surface 62 can be formed by one or more different components.

The forward section of the nacelle inlet 21 including the forward end 60 is formed by a lipskin 22. The lipskin 22 forms portions of both the inner flow surface 61 and the outer flow surface 62. Specifically, the lipskin 22 includes a lipskin inner flow surface 23 that extends between an inner lipskin edge 24 and hilite 25. The lipskin 22 further includes a lipskin outer flow surface 26 that extends from the hilite 25 to an outer lipskin edge 27.

An inner barrel 30 extends aft from the inner lipskin edge 24. The inner barrel 30 includes the inner barrel structural plies 32, a composite core 33, and an inner barrel perforated skin 36. The inner barrel structural plies 32 includes an inner barrel edge band 34 that extends between an inner barrel edge 31 and an inner barrel ramp transition 35. The inner barrel edge band 34 forms a portion of the inner flow surface 61. The inner barrel edge 31 forms a joint 91 with the inner lipskin edge 24. A composite core 33 is bonded to the inner barrel structural plies 32 aft of the inner barrel ramp transition 35. The inner barrel perforated skin 36 forms a portion of the inner flow surface 61.

A generally annular forward bulkhead 40 extends radially across the lipskin annulus 47. In some examples, the forward bulkhead 40 includes a flange 41 that extends across the joint 91 formed by the inner lipskin edge 24 and the inner barrel edge 31. In other examples, the flange 41 is a separate member from the forward bulkhead 40. A duct 45 is formed between the bulkhead 40 and the lipskin 22 at the forward section of the nacelle inlet 21. In addition, a generally annular aft bulkhead (not illustrated) extends radially between the inner barrel 30 and the outer barrel 28.

The nacelle inlet 21 is configured to direct airflow to the engine 103. Airflow that enters through the nacelle inlet 21 flows in the direction of arrow A along the inner flow surface 61 that is formed by the lipskin inner flow surface 23, inner barrel edge band 34, and the inner barrel perforated skin 36.

The lipskin inner flow surface 23 is heated to prevent icing on the surface. In some examples, the heat is provided from high temperature bleed air that is routed from the engine 103 and directed into the duct 45 formed at the forward section of the nacelle inlet 21. In some examples, the bleed air has a temperature of about 1000 F. The heated air directed to this area can result in one or more of the elements in the nacelle inlet 21 being heated to an elevated temperature. In some examples, the forward bulkhead 40 is heated to a temperature of about 740 F and the flange 41 is heated to a temperature range of 350 F-650 F. Furthermore, the temperature of the inner barrel edge band 34 is elevated due to conduction with the flange 41. In some examples, the temperature of the inner barrel edge band 34 may approach a range of approximately 350 F-500 F.

Airflow across the inner flow surface 61 removes heat from the inner barrel edge band 34 and the lipskin 22. However, the surface of the lipskin 22 is substantially smooth which results in laminar airflow across the inner flow surface 61. Heat transfer occurs between the lipskin 22 and laminar airflow, raising the temperature of the airflow boundary layer along the inner flow surface 61. This heat is carried downstream to the inner barrel edge band 34 contributing to a rise in temperature of the inner barrel edge band 34. A turbulator surface 50 formed in the lipskin inner flow surface 23 transitions laminar airflow to turbulent airflow. Turbulent airflow is directed over one or more of the sections of the downstream inner flow surface 61 to enhance the boundary layer heat transfer effect from the one or more components. In one example, turbulent airflow reduces the temperature of the inner barrel edge band 34.

Turbulator surface 50 includes a roughened surface formed on the lipskin inner flow surface 23. Turbulent airflow draws the heat from the one or more components such as the inner barrel edge band 34 and is more effective at reducing temperature than laminar airflow due to boundary layer mixing.

The turbulator surface 50 can include various types of roughened surfaces that transition the airflow from laminar to turbulent. In some examples, the turbulator surface 50 includes a peened surface. The peened surface comprises indentations 53 in the surface of the lipskin 22. The indentations 53 can include different shapes and/or sizes to induce turbulent airflow downstream from the surface 50. The peened surface can be formed by various processes. In one example, turbulator surface 50 is formed by a roto peen process. The process uses a tool having mandrel with a flap featuring the applicable sized shot. The tool is operated at a predetermined rotational speed and applied on the surface of the lipskin inner flow surface 23 for a prescribed length of time. In another example, the process includes media-blasting or shot peening to deform the surface.

In some examples, the turbulator surface 50 is formed on the nacelle inlet 21 during manufacturing. In other examples, the process is performed on existing aircraft that are in use. The processes utilize tools and machinery that facilitate retrofitting existing aircraft.

Figure 4:
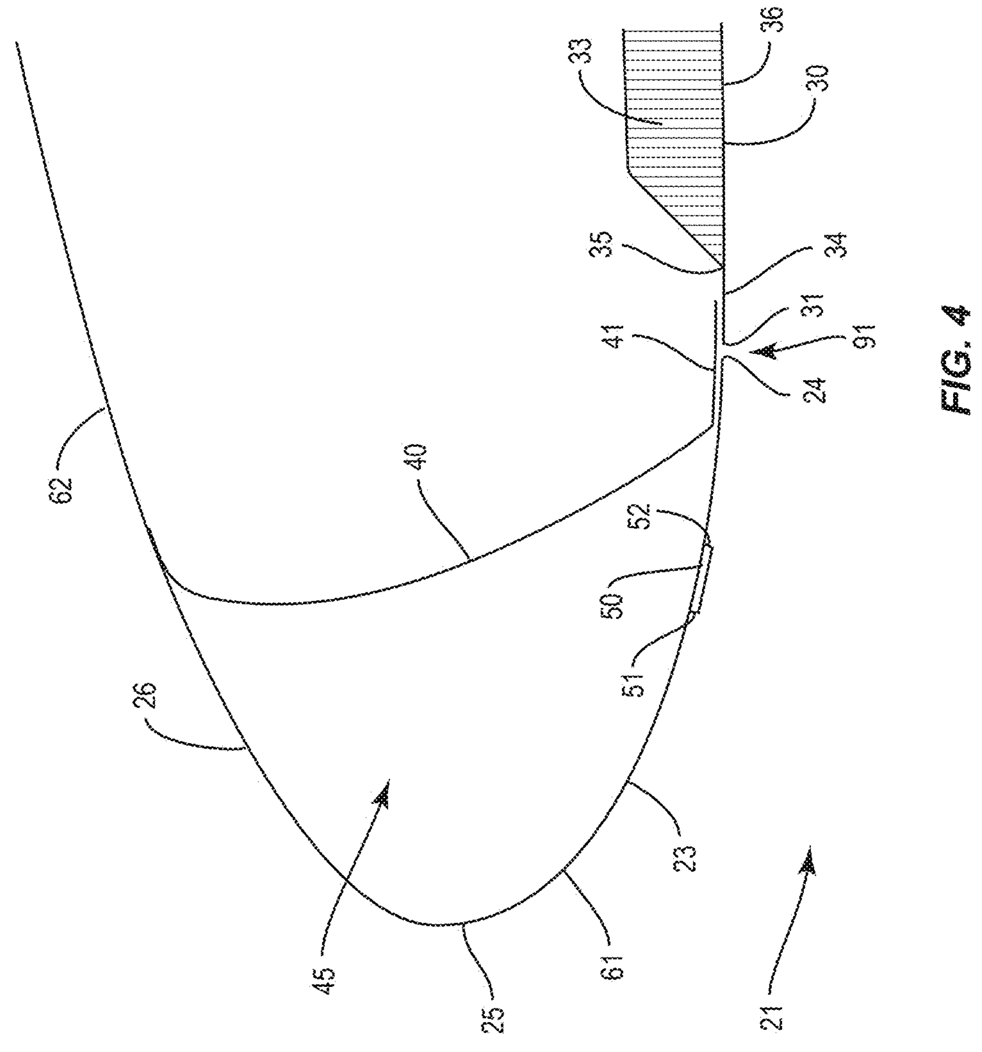
FIG. 4 is an enlarged view of the nacelle inlet portion of FIG. 3.
Figures 5, 6:
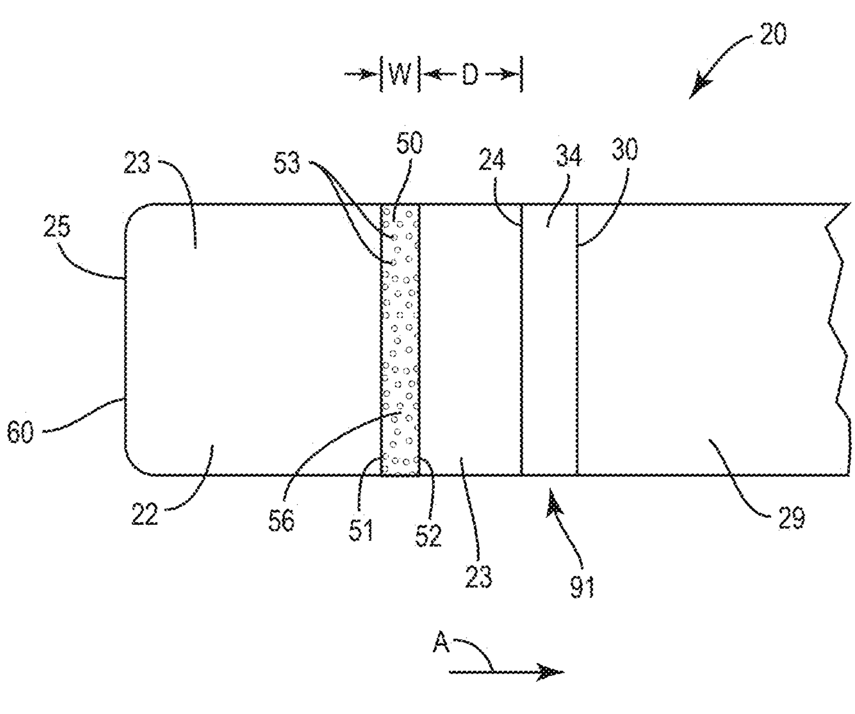
FIG. 5 is a schematic section view of a turbulator surface positioned on an inner flow surface of a nacelle inlet.
FIG. 6 is a schematic section view of another turbulator surface positioned on an inner flow surface of a nacelle inlet.

FIG. 5 illustrates an example of a turbulator surface 50 on the lipskin inner flow surface 23. The turbulator surface 50 is forward of the inner lipskin edge 24 by a distance D. The distance D can vary as the turbulator surface 50 can be at various locations between the hilite 25 and the inner lipskin edge 24. In some examples as illustrated in FIG. 4, the turbulator surface 50 is positioned along the lipskin inner flow surface 23 upstream from the joint 91. In some examples, the turbulator surface 50 is positioned at the inner lipskin edge 24.

The turbulator surface 50 includes a leading edge 51 and a trailing edge 52. In some examples, one or both of the edges 51, 52 are well defined due to the specific forming process. The edges 51, 52 can include various shapes such as straight, curved, and angular features (see FIG. 8). The turbulator surface 50 includes a width W measured between the edges 51, 52. The width W can be constant along the turbulator surface 50 or can vary.

In some examples, the turbulator surface 50 extends completely around the circumference of the nacelle inlet 21. FIG. 5 illustrates an example with the turbulator surface 50 being continuous around the circumference. In other examples, the turbulator surface 50 extends around one or more limited sections of the circumference of the inner flow surface 61. FIG. 6 illustrates an example with the turbulator surface 50 having multiple sections 54*a*, 54*b*, 54*c*, etc. Each of the sections 54 includes a roughened surface configured to induce turbulent airflow. Gaps 55 are formed between the one or more sections 54. The various sections 54 and gaps 55 can include the same or different shapes, sizes, and/or configurations.

Figures 7, 8:
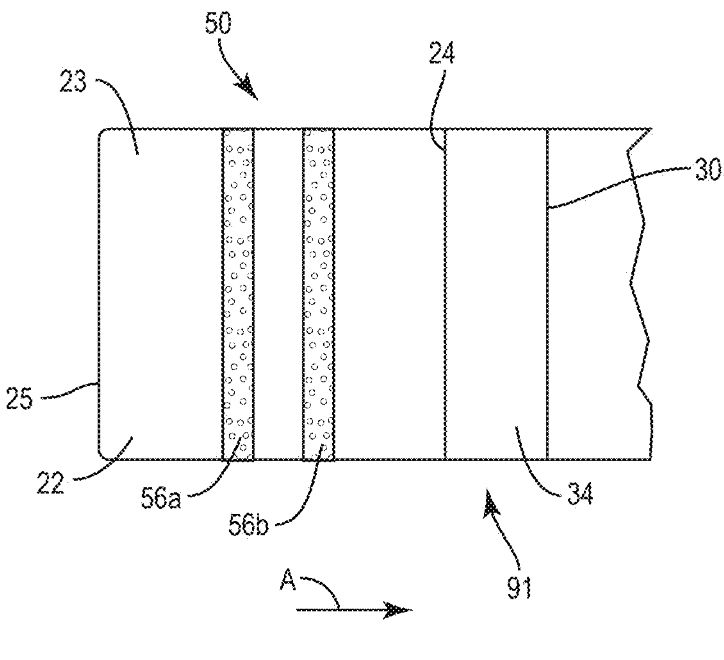
FIG. 7 is a schematic section view of another turbulator surface positioned on an inner flow surface of a nacelle inlet.
FIG. 8 is a schematic section view of another turbulator surface positioned on an inner flow surface of a nacelle inlet.

In some examples, the turbulator surface 50 includes a single strip 56 as illustrated in FIG. 5. In other examples, the turbulator surface 50 includes two or more strips 56. FIG. 7 illustrates an example with a pair of strips 56*a*, 56*b* that are aligned parallel to one another. FIG. 8 illustrates an example with a pair of strips 56*a*, 56*b* each having a chevron configuration.

The turbulator surface 50 includes a roughened surface that is rougher than the surface of the lipskin inner flow surface 23. In one example as illustrated in FIG. 5, the lipskin inner flow surface 23 upstream and downstream from the turbulator surface 50 is smoother than the turbulator surface 50.

The turbulator surface 50 is positioned along the lipskin inner flow surface 23 to induce turbulent airflow to one or more downstream sections of the inner flow surface 61. Turbulent airflow promotes cooling of one or more downstream sections of the nacelle inlet 21, including the lipskin 22, inner barrel edge band 34, inner barrel perforated skin 36, inner barrel structural plies 32, and composite core 33. This cooling occurs due to mixing the boundary layer with the cooler adjacent airflow as a result of the transition from laminar to turbulent. Cooling can also occur to one or more of the components through conduction. In one example, cooling of one or both of the lipskin inner flow surface 23 and the inner barrel edge band 34 results in cooling of the bulkhead flange 41.

In one example, one or more of the components of the inner flow surface 61 are constructed from a composite ply material. In one specific example, the inner barrel edge band 34 is constructed from a composite ply material. The composite ply material includes one or more layers of fibers that are impregnated with one or more of a thermoset and thermoplastic matrix resin. The fibers can consist of a variety of materials, including but not limited to aramids, polyolefins, metal, glass, carbon, boron, ceramic, mineral, and combinations. The fibers are impregnated with a thermoset or thermoplastic matrix resin. In another example, the matrix resin includes a hybrid system of both thermoset and thermoplastic resin. The matrix resin can consist of a variety of substances, including but not limited to acrylics, fluorocarbons, polyamides (PA), polyethylenes (PE) such as polyethylene terephthalate (PET), polyesters, polypropylenes (PP), polycarbonates (PC), polyurethanes (PU), polyetheretherketones (PEEK), polyetherketoneketones (PEKK), polyetherimides (PEI), and other material compositions. This construction from a composite material prescribes a maximum operating limit (MOL) temperature and a maximum short duration limit temperature. Turbulent airflow induced by the turbulent surface 50 promotes the airflow to cool the inner barrel edge band 34 to remain below these limits.

Figure 9:
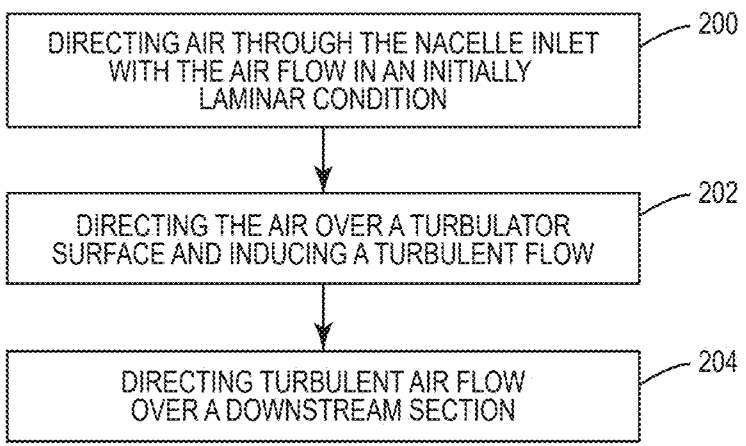
FIG. 9 is a flowchart diagram of a method of cooling a section of an inner flow surface of a nacelle inlet.

FIG. 9 illustrates a method of cooling a section of an inner flow surface 61 of a nacelle inlet 21. The method includes directing air through the nacelle inlet 21 with the airflow in an initially laminar condition along a section upstream from the turbulator surface 50 on the inner flow surface 61 (block 200). The air is directed over the turbulator surface 50 of the inner flow surface 61 after the air has passed over the upstream section and induces laminar airflow to transition to turbulent (block 202). Turbulent airflow is directed over a downstream section of the inner flow surface 61 of the nacelle inlet 21 (block 204).

In the examples disclosed above, the nacelles 20 house engines 103 and are used on aircraft. It should be understood, however, that the disclosure applies equally to nacelles 20 for other types of engines in other applications, such as but not limited to other vehicles or powerplant applications.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A nacelle inlet for an engine, the nacelle inlet comprising:

a lipskin positioned at a forward end of the nacelle inlet, the nacelle inlet comprising a lipskin inner flow surface that extends along an interior side of the nacelle inlet and forms an air inlet for directing air flow to the engine;

an inner barrel positioned downstream from the lipskin inner flow surface; and a turbulator surface positioned in the lipskin inner flow surface, the turbulator surface configured to transition laminar airflow to turbulent airflow downstream along the inner barrel to draw heat from the inner barrel; the turbulator surface defining a strip that extends around a circumference of the lipskin inner flow surface with the strip comprising a width that is measured between a leading edge of the strip and a trailing edge of the strip;

the strip comprises a varying shape that varies in distance away from the inner barrel around the circumference; and the strip comprising a roughened surface defined by a plurality of indentations formed by peening.

2. The nacelle inlet of claim 1, wherein the lipskin inner flow surface comprises a smooth surface and the turbulator surface comprises the roughened surface.

3. The nacelle inlet of claim 1, further comprising a joint formed between a downstream edge of the lipskin inner flow surface and an upstream edge of the inner barrel with the turbulator surface positioned forward from the joint.

4. The nacelle inlet of claim 3, further comprising a bulkhead that spans a lipskin annulus, the bulkhead comprising a flange that extends across an inner side of the joint.

5. The nacelle inlet of claim 1, wherein the turbulator surface extends continuously around a circumference of the nacelle inlet.

6. The nacelle inlet of claim 1, wherein the strip is a first strip and the turbulator surface further comprising one or more additional strips spaced away from the first strip.

7. The nacelle inlet of claim 1, wherein the strip comprises a chevron shape.

8. The nacelle inlet of claim 1, wherein the strip comprises a constant width.

9. A nacelle inlet for an engine, the nacelle inlet comprising:

an inner flow surface that extends along an interior side of the nacelle and forms an air inlet for directing air flow to the engine;

an outer flow surface that extends along an exterior side of the nacelle; and a turbulator surface positioned along the inner flow surface and comprising a roughened surface, the turbulator surface defining a strip that extends around a circumference of the inner flow surface, the strip defining a width measured between a leading edge of the strip and a trailing edge of the strip, the strip formed by peening of the turbulator surface to create a plurality of indentations which form the roughened surface, wherein the strip comprises a chevron shape:

wherein the turbulator surface is configured to transition laminar airflow along the inner flow surface upstream from the turbulator surface to turbulent airflow downstream from the turbulator surface.

10. The nacelle inlet of claim 9, wherein the turbulator surface extends continuously around the circumference of the inner flow surface of the nacelle inlet.

11. The nacelle inlet of claim 9, wherein the width is constant along the strip.

12. The nacelle inlet of claim 9, wherein the strip is a first strip and the turbulator surface further comprises one or more additional strips each with the roughened surface.

13. The nacelle inlet of claim 9, wherein the turbulator surface is positioned along the inner flow surface between a hilite and a downstream edge of a lipskin.

14. A method of cooling a section of the nacelle inlet of claim 9, the method comprising:

directing air through the nacelle inlet with the air initially having laminar airflow along an upstream section of the inner flow surface;

directing the air over the turbulator surface on the inner flow surface after the air has passed over the upstream section and transitioning the air to turbulent airflow; and directing the air with turbulent airflow over a downstream section of the inner flow surface of the nacelle inlet.

15. The method of claim 14, further comprising directing the turbulent airflow through an inner barrel of the nacelle inlet, the inner barrel positioned downstream from a lipskin of the nacelle inlet.

16. The method of claim 14, wherein directing the air over the turbulator surface comprises directing the air over the plurality of indentions.

* * * * *